(12) United States Patent
Grossman et al.

(10) Patent No.: US 11,861,200 B2
(45) Date of Patent: Jan. 2, 2024

(54) DATA BLOCK-BASED SYSTEM AND METHODS FOR PREDICTIVE MODELS

(71) Applicant: IronNet Cybersecurity, Inc., McLean, VA (US)

(72) Inventors: Robert L. Grossman, River Forest, IL (US); Matthew C. Swort, Port Deposit, MD (US); James E. Heath, Sugarloaf, FL (US)

(73) Assignee: IronNet Cybersecurity, Inc., McLean, VA (US)

( * ) Notice: Subject to any disclaimer, the term of this patent is extended or adjusted under 35 U.S.C. 154(b) by 31 days.

(21) Appl. No.: 17/990,601

(22) Filed: Nov. 18, 2022

(65) Prior Publication Data

US 2023/0095468 A1 Mar. 30, 2023

Related U.S. Application Data

(63) Continuation of application No. 16/855,027, filed on Apr. 22, 2020, now Pat. No. 11,507,291.

(51) Int. Cl.
| | |
|---|---|
| H04L 29/06 | (2006.01) |
| G06F 3/06 | (2006.01) |
| H04L 9/06 | (2006.01) |
| G06F 21/62 | (2013.01) |
| G06N 5/025 | (2023.01) |

(52) U.S. Cl.
CPC .............. *G06F 3/064* (2013.01); *G06F 3/067* (2013.01); *G06F 3/0614* (2013.01); *G06F 3/0653* (2013.01); *G06F 21/62* (2013.01); *G06F 21/6245* (2013.01); *G06N 5/025* (2013.01); *H04L 9/0637* (2013.01)

(58) Field of Classification Search
CPC ..................................................... G06F 21/62
See application file for complete search history.

(56) References Cited

U.S. PATENT DOCUMENTS

| | | | |
|---|---|---|---|
| 11,507,291 B2 | 11/2022 | Grossman | |
| 2018/0285839 A1* | 10/2018 | Yang | G06Q 20/3829 |
| 2019/0236598 A1* | 8/2019 | Padmanabhan | G06Q 20/389 |
| 2019/0392530 A1* | 12/2019 | Kursun | G06F 16/137 |
| 2021/0333995 A1 | 10/2021 | Grossman | |

OTHER PUBLICATIONS

Examiner Interview Summary issued in U.S. Appl. No. 16/855,027 dated Jul. 21, 2022.
Grossman et al.; U.S. Appl. No. 16/855,027, filed Apr. 22, 2020.
USPTO; Final Office Action issued in U.S. Appl. No. 16/855,027 dated Jan. 26, 2022.
USPTO; Notice of Allowance issued in U.S. Appl. No. 16/855,027 dated Jul. 21, 2022.
USPTO: Non-Final Office Action issued in U.S. Appl. No. 16/855,027 dated Sep. 3, 2021.

* cited by examiner

*Primary Examiner* — Jason K Gee
(74) *Attorney, Agent, or Firm* — Fitch, Even, Tabin & Flannery LLP

(57) ABSTRACT

Systems and methods for recording information at a granular level; checking and verifying that data is used and processed is consistent with an entity's internal policies and/or external regulations; and producing reports to authorized users (e.g., individuals and organizations) with information are provided. The system and methods capture required data in an immutable fashion so that users outside of an entity (e.g., public, third parties) can check and audit that internal policies and other regulatory policies and frameworks are followed.

20 Claims, 8 Drawing Sheets

DATA BLOCK-BASED SYSTEM AND METHODS FOR PREDICTIVE MODELS

This application is a continuation of U.S. application Ser. No. 16/855,027, filed Apr. 22, 2020, for DATA BLOCK-BASED SYSTEM AND METHODS FOR PREDICTIVE MODELS, which is incorporated in its entirety herein by reference.

FIELD OF THE DISCLOSURE

The present disclosure relates to cybersecurity, fraud and risk systems. More particularly, the disclosure relates to systems, methods and architecture for the collection and use of data, and the processing of data for analytic models and workflows.

BACKGROUND OF THE DISCLOSURE

Building and deploying cybersecurity, fraud and risk models using conventional systems and methods have a number of challenges in trying to ensure that relevant and data sharing policies, as well as all required regulatory requirements are followed. Applying known machine learning techniques to build and deploy fraud and risk models requires collecting the required data, cleaning and transforming the data to build the required features, either directly through feature engineering or indirectly through deep learning, estimating the parameters of the models, and then deploying the models into operational systems to process and score the data, either in batch or in near real time. There are policies and regulatory requirements about what data is collected and how users are informed, what data is shared and with whom, what data is used to build models, what data is used as the inputs to models to produce scores, and what actions are taken by systems based upon the scores. Users whose data is collected, members of data sharing consortium, customers that buy collected or processed data, and customers that buy models or scores, and users whose interactions with systems are determined in part by models and scores, each of whom have an interest in verifying claims that data, models, scores and actions are all compliant with relevant policies and regulatory requirements. This task is quite difficult given how data is collected in conventional systems, in conjunction with how models are typically built and integrated into user facing systems.

Conventional systems and methods have three primary disadvantages. First, regarding collection and use of data, data collection, data access, and used for analytic models is not currently captured in a way that provides a complete custody or "provenance chain." Regarding processing of data for analytic models and workflows, methods of cleaning, processing and aggregating data for fraud and risk analysis is not captured in a way that provides a complete custody or provenance chain. This data may be needed to produce "features" or used as inputs to models or workflows and is subject to audit or to continuous checking of regulatory requirements, privacy rules, or data sharing rules. Regarding inspection and auditing of data use and data processing, conventional methods and systems rely on manual creation and maintenance of reports of the data flows that collect data and the ways that data models and scores are used by internal processes and systems. These reports further rely on manual updates as different data sources are used or as the system is changed. These reports are then used when regulatory disclosures, audit reports and similar reporting is required. The manual nature of such reporting inserts time delay and is also a source of error that will propagate throughout the system. In practice, it is common that models and workflows are changed, but the documentation that is used for compliance purposes is not changed which leads to a gap between the documentation that is consistent with the policies and regulations and the model that has drifted from and therefore no longer compliant with the policies and regulations.

BRIEF SUMMARY OF THE DISCLOSURE

Embodiments of the present invention provide systems and methods for the collection and use of data, and the processing of data for analytic models and workflows. The embodiments herein log each time data is collected, accessed or processed. In an embodiment, a system for data sharing with a plurality of users, from an organization or a consortium of organizations, and checking rule compliance is provided. The system comprises: a block-based storage system containing data blocks; a first module coupled to the block-based storage system for creating and reading the data blocks; a second module adapted and configured to manage at least one of logging of data collection, data access by at least one of the plurality of users, data access by the system, and an execution of workflows; and a third module adapted and configured to ensure the system is compliant with a plurality of rules.

In an embodiment, the data blocks within the block-based storage system comprise at least one of data storage blocks and data provenance blocks. In an embodiment, the plurality of rules are at least one of data collection rules, data sharing rules, privacy rules and regulatory requirements. In an embodiment, the first module is adapted and configured to be a centralized ledger. In an embodiment, the plurality of users are all from the same organization or the same consortium of organizations. In an embodiment, the third module is adapted and configured to enable at least one of the plurality of users from within the organization or the consortium of organizations to check whether data collection is compliant with at least one of the plurality of rules. In an embodiment, third module is adapted and configured to enable at least one of the plurality of users, outside of the organization or the consortium of organizations, with confirmation of whether at least one of access to and processing of the data by the system, data sharing, building of models, use of scores and other outputs from models and workflows is compliant with at least one of the plurality of rules. In an embodiment, the first module is adapted and configured to use a block chain. In an embodiment, the third module is adapted and configured so that at least one of the plurality of users are outside of an organization or consortium of organizations. In an embodiment, the third module is adapted and configured to enable at least one of the plurality of users within an organization or the consortium of organizations to check whether data collection is compliant with at least one of the plurality of rules. In an embodiment, the third module is adapted and configured to enable at least one of the plurality of users, outside of the organization or the consortium of organizations, to check whether data collection is compliant with at least one of the plurality of rules. In an embodiment, the third module is adapted and configured so that at least one of the plurality of users, from within the organization or the consortium of organizations, with confirmation of whether at least one of access to and processing of the data blocks by the system, data sharing, building of models, use of scores and other outputs from models and workflows is consistent with at least one of the plurality of rules. In an embodiment, the third module is adapted and configured to provide at least one of the plurality of users outside of the organization or the consortium of organizations with confirmation of whether at least one of access to and processing of the data blocks by the system, data sharing, building of models, use of scores and other outputs from models and workflows is compliant with at least one of the plurality of rules.

In an embodiment, the second module is adapted and configured to check that data collection is consistent with at least one of the plurality of rules. In an embodiment, the second module is adapted and configured to check that the use of scores and other outputs from models and workflows is compliant with at least one of the plurality of rules. In an embodiment, the second module is adapted and configured to check that access to and processing of the data modules by the system is compliant with the at least one of the plurality of rules. In an embodiment, the second module is adapted and configured to check whether at least one of data sharing and building of models is consistent with at least one of the plurality of rules. In an embodiment, a log of access to the data blocks by the system is saved to the first module. In an embodiment, the third module is adapted and configured to enable at least one of the plurality of users outside the organization or the consortium of organizations with confirmation whether data collection is compliant with at least one of the plurality of rules. In an embodiment, the third module is adapted and configured to enable at least one of the plurality of users from within the organization or the consortium of organizations to check whether at least of one of access to and processing of the data blocks by the system, data sharing, building of models, use of scores and other outputs from models and workflows is compliant with at least one of the plurality of rules.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The present disclosure is illustrated and described herein with reference to the various drawings, in which like reference numbers are used to denote like system components, as appropriate, and in which.

DETAILED DESCRIPTION OF THE DISCLOSURE

Figure 1:
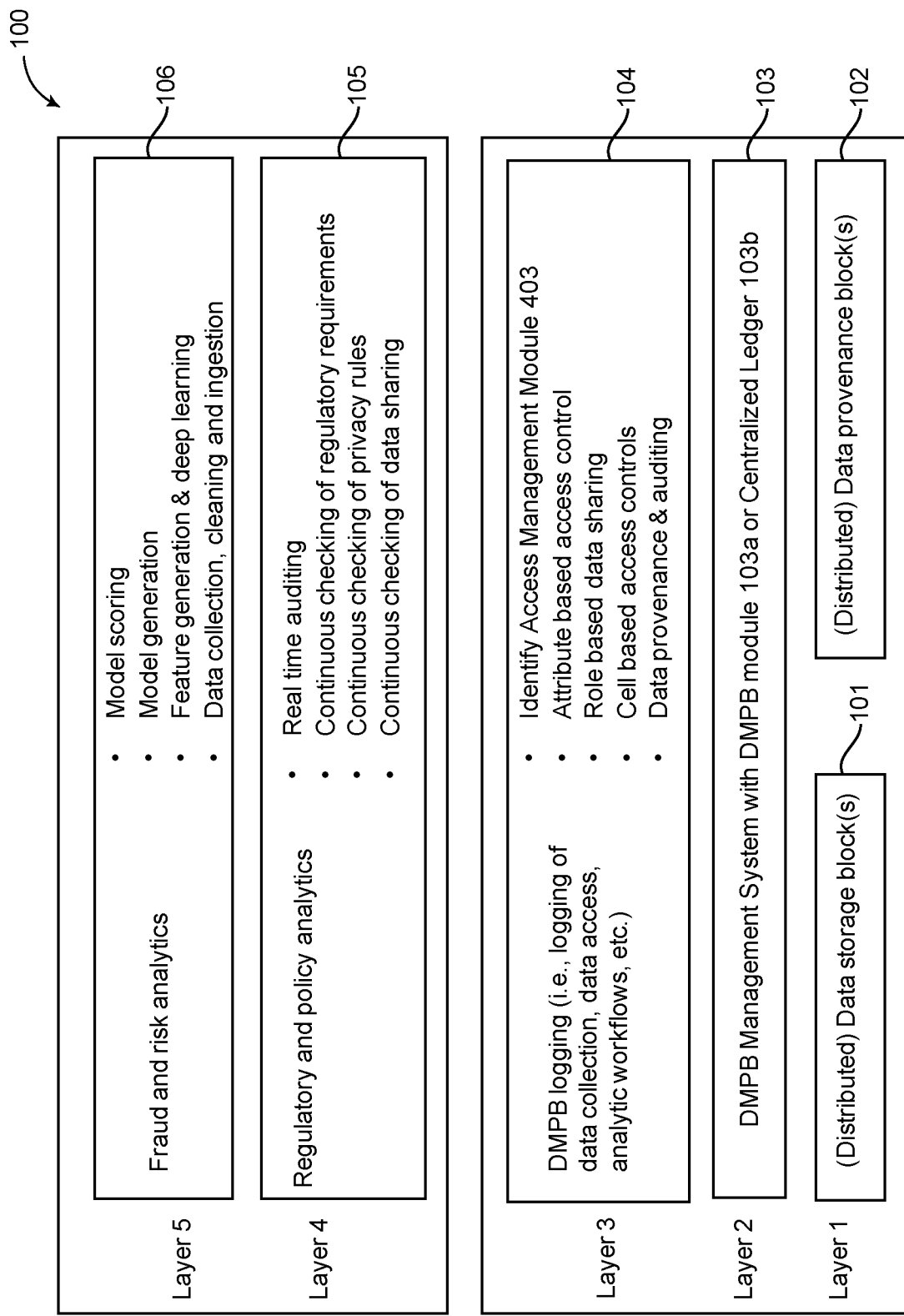
FIG. 1 is a block diagram of a system according to embodiments of the present invention.

Embodiments of the invention include i) automated processes for recording information at a granular level; ii) methods for checking/verifying that data is used and processed is consistent with an entity's internal policies and/or external regulations; and iii) methods for producing reports to authorized users (e.g., individuals and organizations) with information related to items i) and ii). Embodiments also include systems for capturing required data in an immutable fashion so that users outside of an entity (e.g., public, third parties) can check and audit that internal policies and other regulatory policies and frameworks are followed. These policies and frameworks may include ensuring that: i) data is collected appropriately; ii) data is appropriately processed to be used as inputs to fraud or risk models; iii) inputs are processed by fraud and risk models and workflows to produce scores (e.g., risk scores) appropriately; and iv) scores are used by fraud and risk systems appropriately. In an embodiment, a system is provided such that members of a consortium can also check and audit these four processes. A consortium may, for example, check that user location data is not used for ad targeting or that user data is not used to build risk models.

An example of a workflow for a risk model is when a user risk model is used to produce a score about the user's overall risk; a separate transaction risk model is used to produce a score about the risk of a particular transaction; both of the scores, plus additional inputs, are used as input to a third risk model that produces a third score that integrates the scores from the two models; and, the third score is used as input to a fourth model, that rescales the score and applies certain business rules, such as ignoring small dollar transactions that may unnecessarily inconvenience the user compared to the potential reduction in risk to the organization. Examples of other outputs of models beyond scores include the confidence level associated with the score and certain explanatory codes or strings that can be used to help explain to the user why the score was particularly high or low.

There are several benefits and advantages of the embodiments provided herein, including but not limited to, the following examples. Embodiments herein utilize distributed data objects (e.g., data storage blocks) in order to capture all the relevant collected and processed data at a scale and level of granularity required. Distributed data objects (e.g. provenance blocks) are provided that contain provenance information about the data, how and when it is accessed, and how and when it is processed and "cell level access methods" are provided that ensure users are given access to precisely the data that they are authorized to view at the granularity required. In addition, analytic processing of data is expressed in workflow languages and immutable logs of the workflows are created by the embodiments using provenance blocks which are used to capture the internal processing of data, model inputs, model outputs, and system alerts and notifications at the scale and granularity required. Further, distributed data and provenance blocks with blockchain or centralized ledgers according to embodiments herein provide access to public and consortium members to precisely the data they are authorized to see.

FIG. 1 is an overview of a system 100 according to an embodiment of the present invention. The system 100 consists of a plurality of layers, with modules and components in layers communicating to the layers above or below using application programming interfaces (APIs). Layer 1 is a distributed data block-based secure storage layer that includes one or more data storage blocks 101 and one or more data provenance blocks 102 in a data lake (not shown). Layer 2 is an infrastructure or management module 103 coupled to Layer 1 for managing the data storage blocks 101 and data provenance blocks 102. In an embodiment, the data block system management module 103 of Layer 2 includes a Data and Model Provenance Blocks (hereinafter "DMPB") module 103a. In an embodiment, Layer 2 includes a centralized ledger 103b. The management module 103 is adapted and configured to store and/or manage one or more of the following: immutable cryptographically signed logs, claims, and other assertions about user access, data access, data provenance, data processing and related events. (Note, the acronym DMPB herein is used throughout this disclosure to describe the data and model provenance blocks that contain information about how data is processed, and, in particular, how data is processed to produce fraud and risk models.)

In an embodiment, DMPB module 103a uses blockchain so that a mechanism can be provided to members of the public who have contributed their own data and interacted with the system can check how their data is used by the system 100 and that this use is consistent with the required policies and regulations. Once a user registers with the system 100, the user is assigned a random string of letters and numbers (i.e., the block chain user ID) that is associated with all user related data in data storage blocks 101 and all provenance related data in data provenance blocks 102. Since the data storage blocks 101 and data provenance blocks 102 may be immutable and cannot be changed once they are written, the system 100 may provide the user with the necessary information about what data of theirs was collected and how it was used.

Layer 3 is a logging module 104 that includes an identity, authorization and access management (IAM) module 403. The logging module 104 communicates to the DMPB module in Layer 2 via API calls. The IAM module 403 provides: a) identity access management, b) role based and attribute-based access controls; c) fine-grained cell-based access controls; and d) data provenance and auditing. The IAM module 104 writes immutable cryptographically signed logs about user access, data access, data provenance, data processing and related events to Layer 2. Layer 4 is a rule (e.g. regulatory and policy) analytics module 105 that is adapted and configured to provide real-time processing and auditing, including: a) continuous checking of data sharing rules; b) continuous checking of privacy rules; c) continuous checking of regulatory requirements, and d) real-time auditing of the continuous checking of steps a), b) and c). Layer 5 is a fraud and analytics module 106 that provides functionality for building and deploying risk and fraud models with data provided by layer 1, with identify and access management provided by Layer 2, and with rules (e.g. data sharing, privacy rules, and regulatory requirements) checking provided by Layer 3.

Embodiments of the identity, authorization and access management TAM module 403 of Layer 3 and the rule analytics module 105 of Layer 4 may be provided with either a centralized ledger 102 or DMPB module in Layer 2. A public governance model for Layer 2 data blocks can be used, or a consortium or federated governance model for a centralized ledger can be used so that access to the data is limited, for example, to partners providing data for the fraud and risk models or to partners deploying the risk and fraud models developed by the system.

Figure 2:
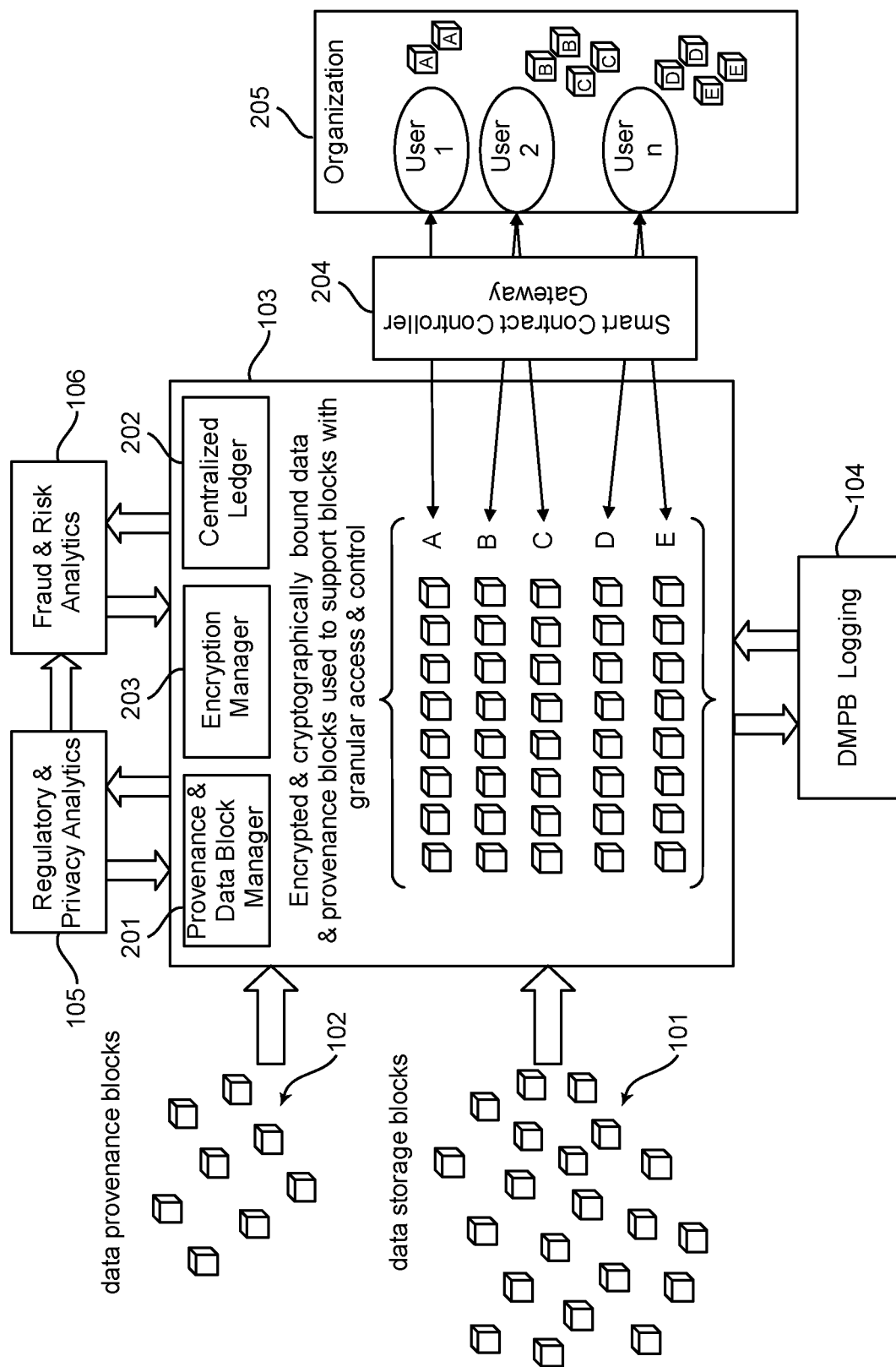
FIG. 2 is a diagram of the structure of an encrypted data block such as data storage blocks and data provenance blocks within a system according to embodiments of the present invention.

FIG. 2 illustrates the operation of the management module 103 of Layer 2 in FIG. 1. As the various steps required to build fraud and risk models are completed by the system 100, the completion of each step (e.g., assertions or claims) is written by Layer 3 to a DMPB 103a or to a centralized ledger 103b in Layer 2, depending upon a desired governance model. The management module 103 provides all the information necessary to check that fraud, risk and other models are collecting and processing data appropriately as required by the rules (e.g., internal policies and external policies and regulations). As data is accessed by users (e.g., User 1, User 2 . . . User n) within an organization 205, as data is processed to produce models, and as scores produced by models are processed, data and model provenance assertions/claims are written by the IAM module 104 of Layer 3, as also illustrated in FIG. 2.

Whenever data is collected or accessed, appropriate checks are made to ensure that all required conditions and regulations are satisfied, and the appropriate assertions/claims would be recorded by Layer 4. Data storage blocks 101 are the smallest, most granular piece of information that is to be stored within the system 100. All data storage blocks 101 are cryptographically bound to the visibility and sharing restrictions in accordance with policies defined by the user such as encrypted data block 301. Data storage blocks 101 are then encrypted for processing and persistence using encryption header 302 and encrypted payload 303. In an embodiment, data storage blocks 101 are centralized. In another embodiment, data storage blocks 101 are geographically distributed within all applicable geographic regions to enable high-availability, failover, locality-based speed of response, and consistency of user experience. Visibility of data storage blocks 101 is cryptographically attached to each data storage block 101. Access to these data storage blocks 101 requires the appropriate authorizations for secure data sharing based on user access visibility assessed through a Smart Contract associated with contract checker 204.

Data provenance blocks 102 are a record of all interactions with data storage blocks 101. They also provide an immutable record of how fraud and risk models are built and how they are used to process and to score user data. When a data storage block 101 is created by a user within an organization, who or what created it, when it was accessed, who or what accessed it, why it was accessed, and where it was used are stored. Provenance blocks are used for patterns of life, attribution, pedigree, and lineage of the data blocks. This is a continuous process for appending immutable transaction details to the data block for its lifetime. Provenance records, unless otherwise prohibited by law or customer policy, are retained after data blocks are deleted for analysis.

Figure 3:
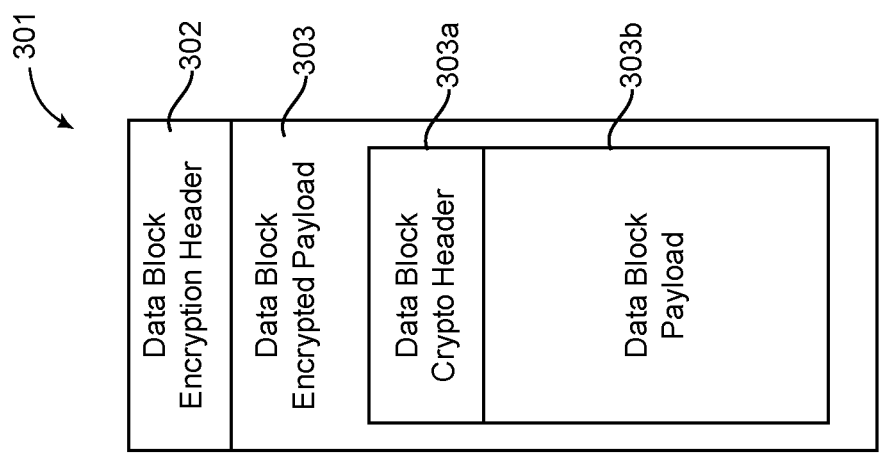
FIG. 3 illustrates a data block according to embodiments of the present invention.

FIG. 3 illustrates the structure of an embodiment of an encrypted data block 301 such as data storage block 101 or data provenance block 102, which may be utilized in Layer 1 of FIG. 1. Encrypted data block 301 includes an encryption header 302. The encryption header 302 contains the information necessary so that each encrypted data block 301 may be part of a distributed block-based storage system that may include a plurality of data storage blocks 101 and data provenance blocks 102. The encrypted data block 301 also includes an encrypted payload 303, whose encrypted key is provided in the encryption header 302.

The encrypted payload 303 is comprised of two parts: 1) a crypto header 303a, which contains provenance related information, and the associated payload 305. The crypto header 303a contains a cryptographic signature that is used to verify the integrity of the data storage block 30, so that it is immutable. This is necessary so that the encrypted data block 301 itself can be audited by the Regulatory and Provenance Analytics of the rule analytics module 105. Finally, the payload 303b contains the actual data being managed by the encrypted data block 301. This may include the original data and/or provenance information about the data generated by the system 100. The payload 305 may contain several different types of data, that includes, but is not limited to: data collected for analysis by the system; cleaned, aggregated, and transformed data that are inputs to analytic models; the outputs of analytic models, which may be the inputs of other analytic models that are part of an analytic workflow. Scores produced by analytic models or analytic workflows; analytic models themselves in a serialized or other format so that they can be stored in one or more data storage blocks 101. Rules that are used for post-processing analytic models and analytic workflows before they are passed to other external interfaces and components. These rules are also in a serialized or other format so that they can be stored in one or more data storage blocks 101.

Creation of provenance records. Provenance records in data provenance blocks 102 are created by the system for a number of different reasons and purposes, including, but not limited to when new data storage block 101 is created, updated, or deleted. In an embodiment, data is only deleted or changed when required by the rules such as regulations or policy. Data is immutable and changes to data are made by appending the changes to the current state of the data, or using another mechanism for creating and maintain immutable data, so that there is a complete audit chain of all changes to the data under one or more of the following conditions: when data storage blocks 101 are access by any user or system process; or when a policy requirement of a regulation changes the access rules for data. A regulation change may be, for example, that provenance records can be hidden after a requirement to purge data following a request for the right to be forgotten.

Returning to FIG. 2, the provenance & data block manager 201 continuously evaluates data storage blocks 101 for changes in customer policy and enforces regulatory modifications required for access to the data storage blocks 101. If a data block policy is updated for any reason, it is tracked via data provenance block 102 for later analysis. The provenance & data block manager 201 is also adapted and configured to provide auditing and precision data deletions periodically or as desired. Centralized Ledger 202 is an immutable storage mechanism for the provenance & data block manager 201. Centralized ledger 202 supports continuous auditing and transparency for the life of provenance block 102 and data storage block 101. The encryption manager 203 provides functionality to associate inbound data storage block 101 and provenance block 102 with the appropriate encryption tokens and supports alignment of users and/or processes access through the contract checker 204 (e.g., Smart Contract Controller Gateway) or to the encryption tokens required for access to the data within the data storage block 101. The contract checker 204 is the entry point from the organization 205 to the management module 103. It facilitates authentication and authorization for each user or process that is to be granted access. It is the policy determination point which verifies the user and/or process identity, location, and access privileges.

Figure 4:
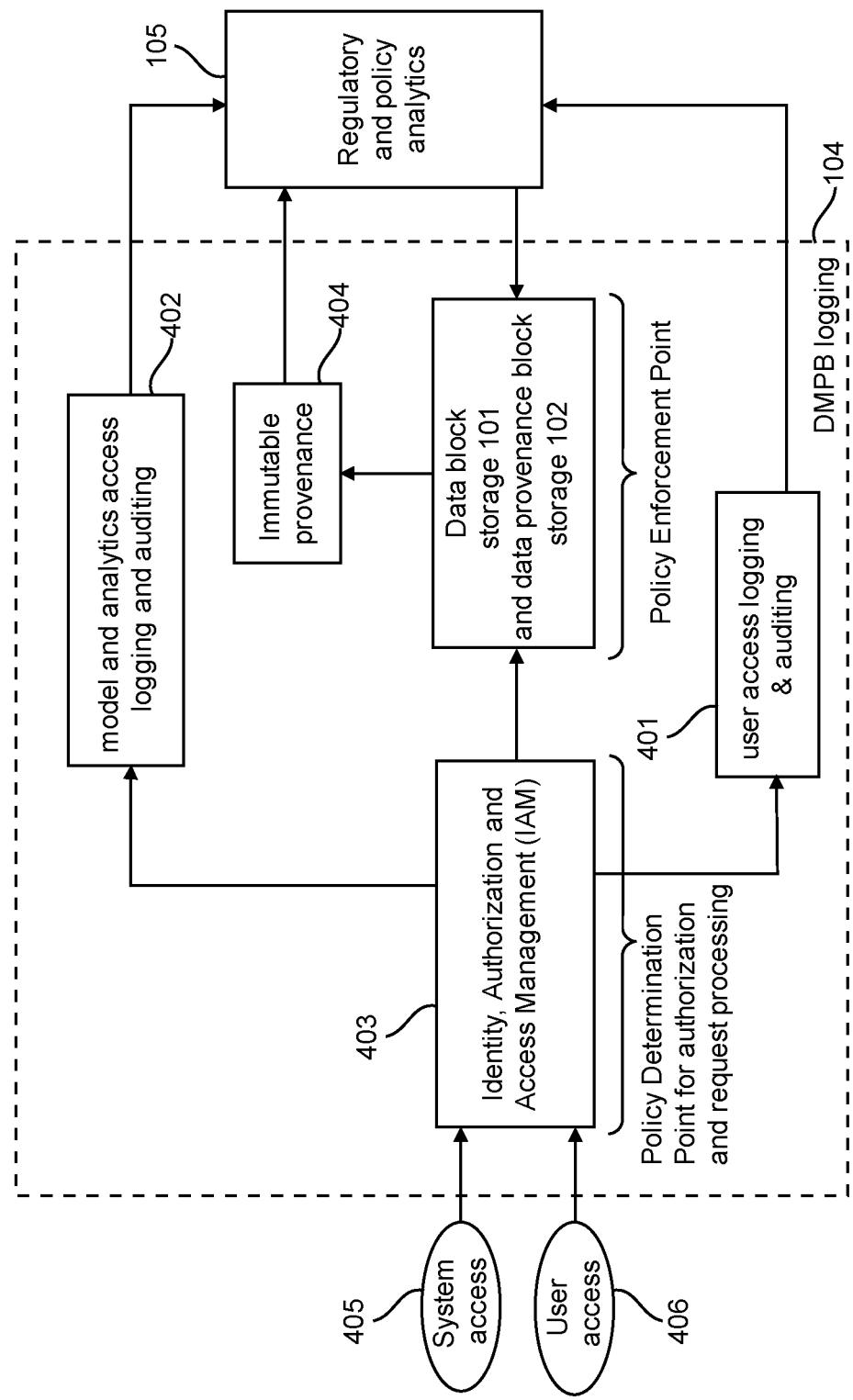
FIG. 4 illustrates how the Data and Model Policy Block (DMPB) module logs relevant data according to embodiments of the present invention.

FIG. 4 illustrates how the logging module 104 logs all relevant data. The logging module 104 logs both user access 406 and system access 405. Both are authenticated and authorized using the identity, authorization and access management (IAM module) 403. Based upon the IAM module 403, reads and writes are permitted on the data storage block 101 and data provenance block 102. The rules analytics module 105 accesses the data provenance blocks 102 to check that the appropriate policies and regulations are enforced. Note, data storage block 101 and data provenance block 102 are not part of the logging module 104, as can be seen in FIG. 4.

Figure 5:
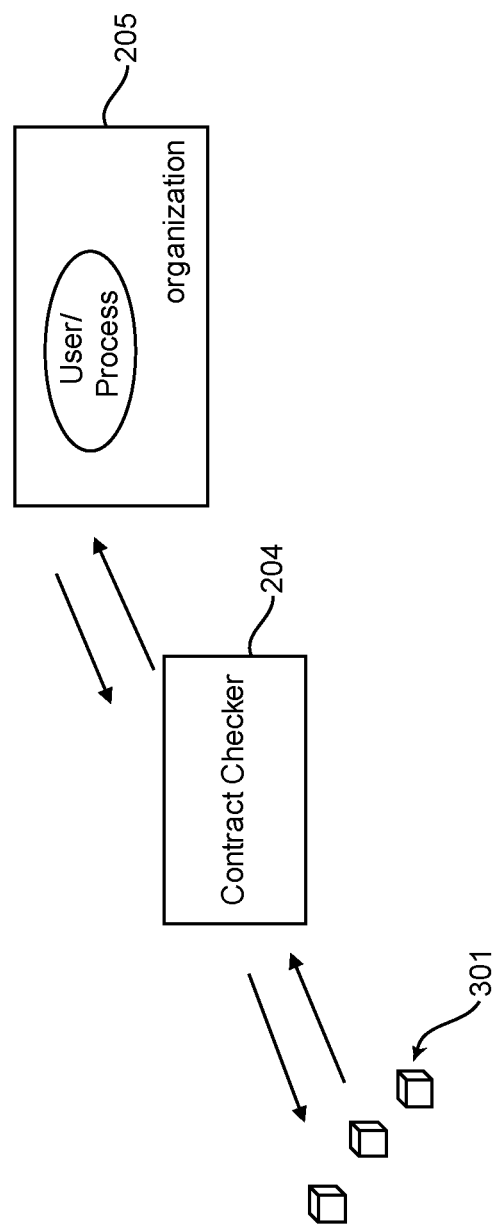
FIG. 5 is a block diagram of a contract checker being used to access encrypted provenance blocks according to an embodiment of the present invention.

FIG. 5 illustrates how smart contracts allow users and organizations to verify directly that internal entity policies and third-party regulations are being followed, without an entity's participation or the participation from other third parties. For example, as illustrated in FIG. 5, organization 205 (e.g., user group, entity, system process etc.) can use a contract checker 204 to access encrypted data blocks 301. As long as the user or system request has access to the relevant data, as determined by the IAM module 403, the provenance data within the encrypted data block 301 may be accessed and analyzed by the rules analytics module 105, 801, with the results returned to the requester. This is because the necessary provenance data has been stored in immutable provenance blocks 102 by the model and analytics logging module 402, as shown in FIG. 7.

Figure 6:
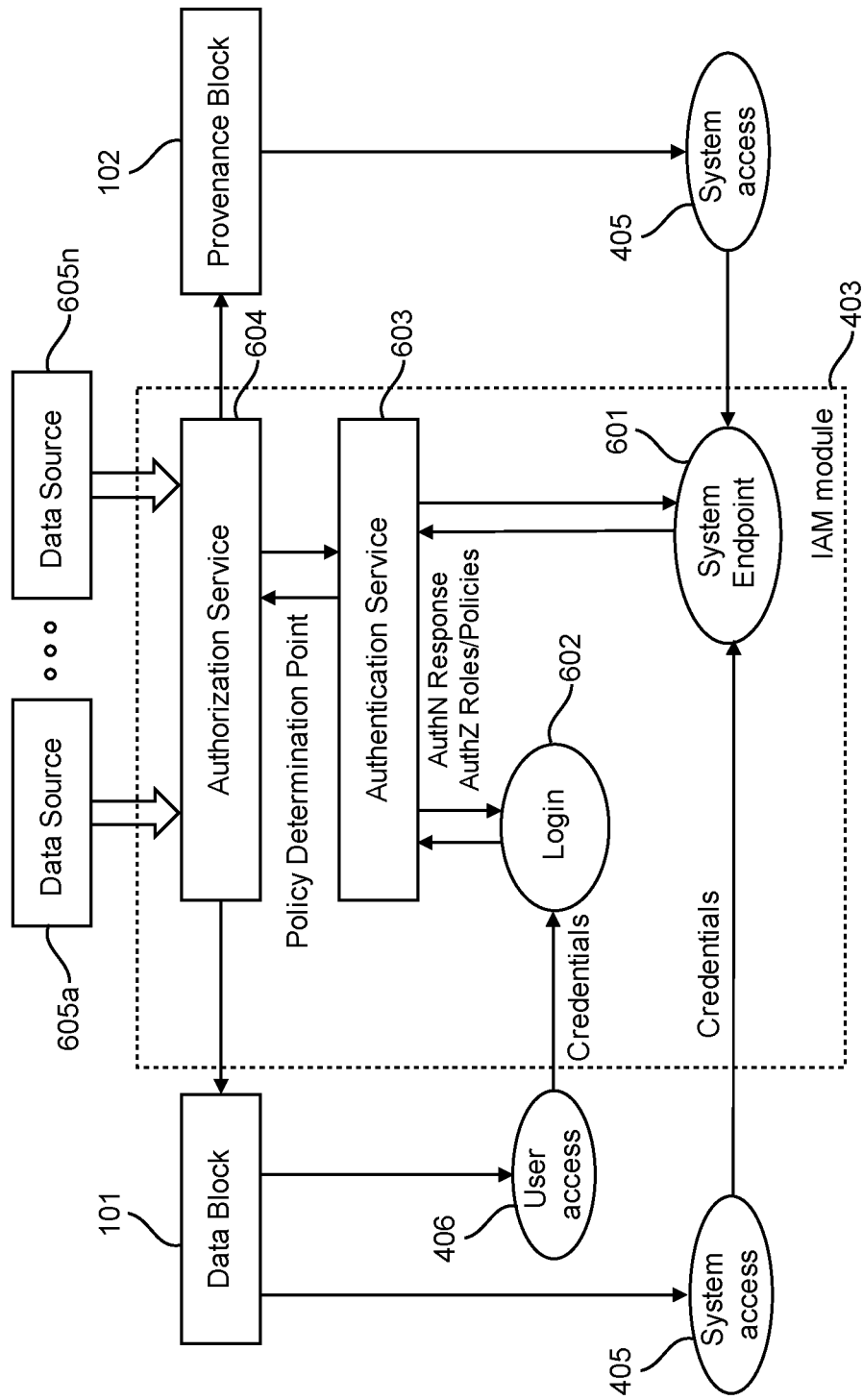
FIG. 6 illustrates the identity, authorization and access management (IAM) module for both user access and system access to the data blocks and provenance blocks according to embodiments of the present invention.

FIG. 6 shows how the fine-grained identity and access management (IAM) is handled by the IAM module 403 for both user access 406 and system access 405 to data storage block 101 and data provenance block 102. User and system identity is first authenticated with the authentication services 603. Once authenticated the access to a particular field of data storage block 101 or data provenance block 102 is provided by the authorization service 604. Data may be from multiple data sources 605a-n, but access is provided to precisely the data source 605a-n and to precisely only the authorized fields within the data sources as needed. In other words, the authorization to access data is fine grained or, what is sometimes called cell based, and authorization is not provided to entire datasets, unless the user or system process is authorized to access the entire dataset. The data and provenance blocks are encrypted as shown in FIG. 3 and only decrypted when the user or system is authorized to access a particular field or fields.

Figure 7:
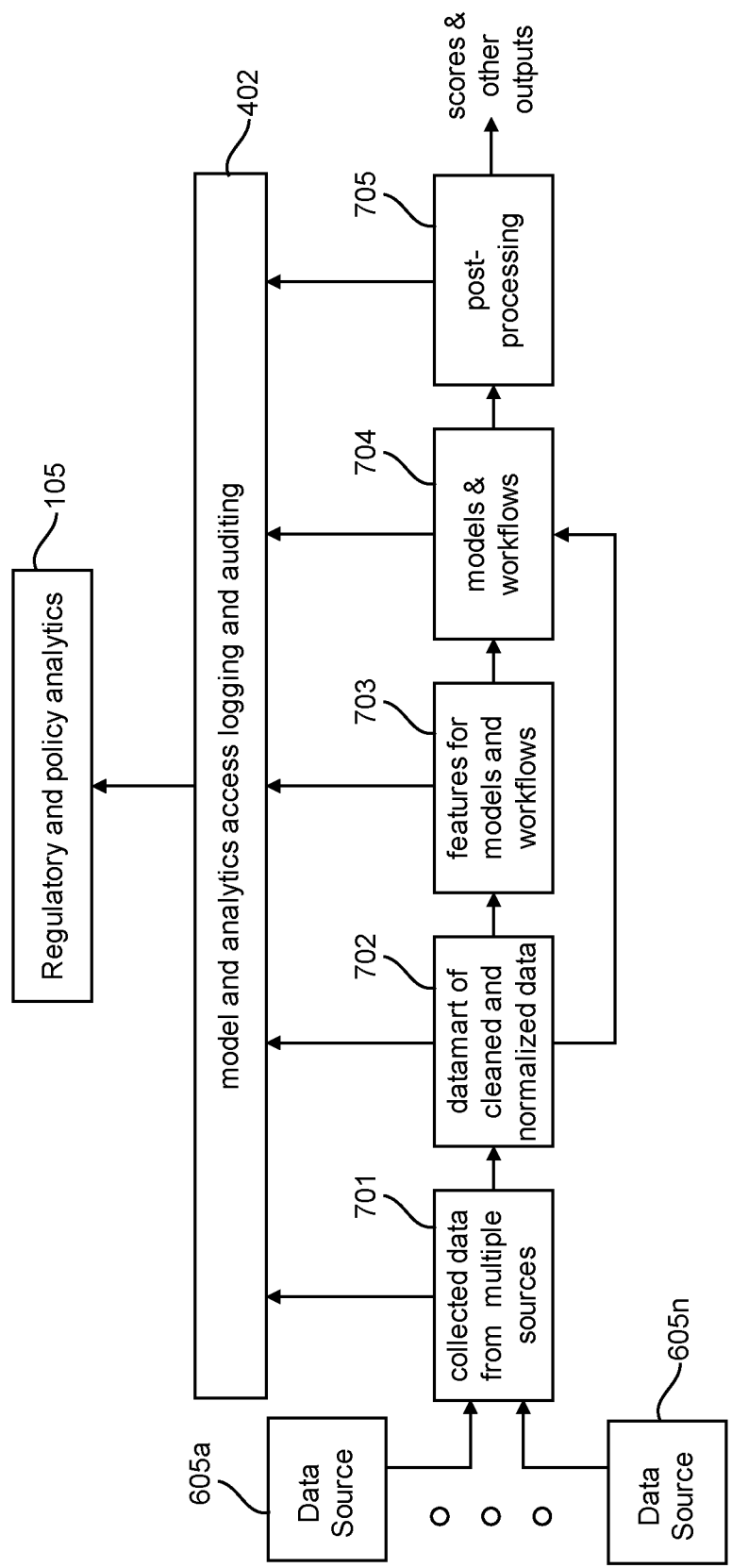
FIG. 7 illustrates a method for model and analytic scoring logging and auditing according to embodiments of the present invention.

FIG. 7 is a flow chart of a method for model and analytic scoring, logging and auditing according to an embodiment of the present invention. Provenance records are kept of the workflows used for the following steps. Step 701 collects data from multiple sources 605a-n. Step 2 cleans and normalizes the data. Step 3 computes features (e.g., features for aggregating or transforming data). Step 704 uses the features as inputs to models and workflows. Step 705 uses the scores produced by the models and workflows in step 704 as inputs to the post-processing rules to produce the final scores and other outputs. The processing steps 701 through 705 may be implemented or expressed in different ways.

One of the common implementations is to express each workflow as a directed acyclic graph (DAG), in which each node of the graph is a software program or application called, and with a directed edge between two nodes indicating how the outputs from one node are used as the inputs to another node. Each software program or application is labeled with a unique label and available in an environment or framework that allows its execution. For example, in an embodiment, the software program or application may be in a Docker container or other container, which provides a virtualized environment that encapsulates software applications and all the required libraries and configuration files. Alternately, in another implementation, the software program or application may be part of a serverless framework. In this context, a container is a packaging of software and the necessary software libraries and configuration files so that the container may be run using a cloud-computing platform as a service execution model that uses virtualization to: i) support the execution of programs within containers, and ii) the ability of containers to communicate with other containers, as specified in appropriate configuration files. In this context, a serverless framework is another cloud-computing execution model in which the cloud service provider runs the server or servers executing the software code, and dynamically manages the allocation of machine resources required to run the server or servers.

In this way, each node in each workflow corresponding to a software program or application is assigned a unique label and this information is persisted in an immutable provenance block 102. In addition, each workflow is assigned a unique label and also persisted in immutable provenance blocks. In this way, provenance information persists in the provenance blocks 102 capturing the data source 605n and the processing workflow steps 701, 702, . . . , 705. This enables the logging module 402 to associate an immutable provenance record with each score or other output produced by the fraud and risk analytics module 106 of FIG. 2. Given these provenance records, the rules module 105 can review the compliance of the scoring either record by record as the scoring is done, or periodically by examining batches of scored data and their associated provenance record. As an alternative implementation, a single provenance record that contains the totality of information characterizing the data source 605n and the processing 701, 702, . . . , 705 can be associated and used to provide the immutable provenance information for each single score or for a batch of scores produced by the fraud and risk analytics system 106. In some implementations, the clean and normalized data from step 702 is directly used by the analytic models and workflow step 704 and does not need necessarily to compute features in step 703. This is the case, for example, with deep learning models.

Figure 8:
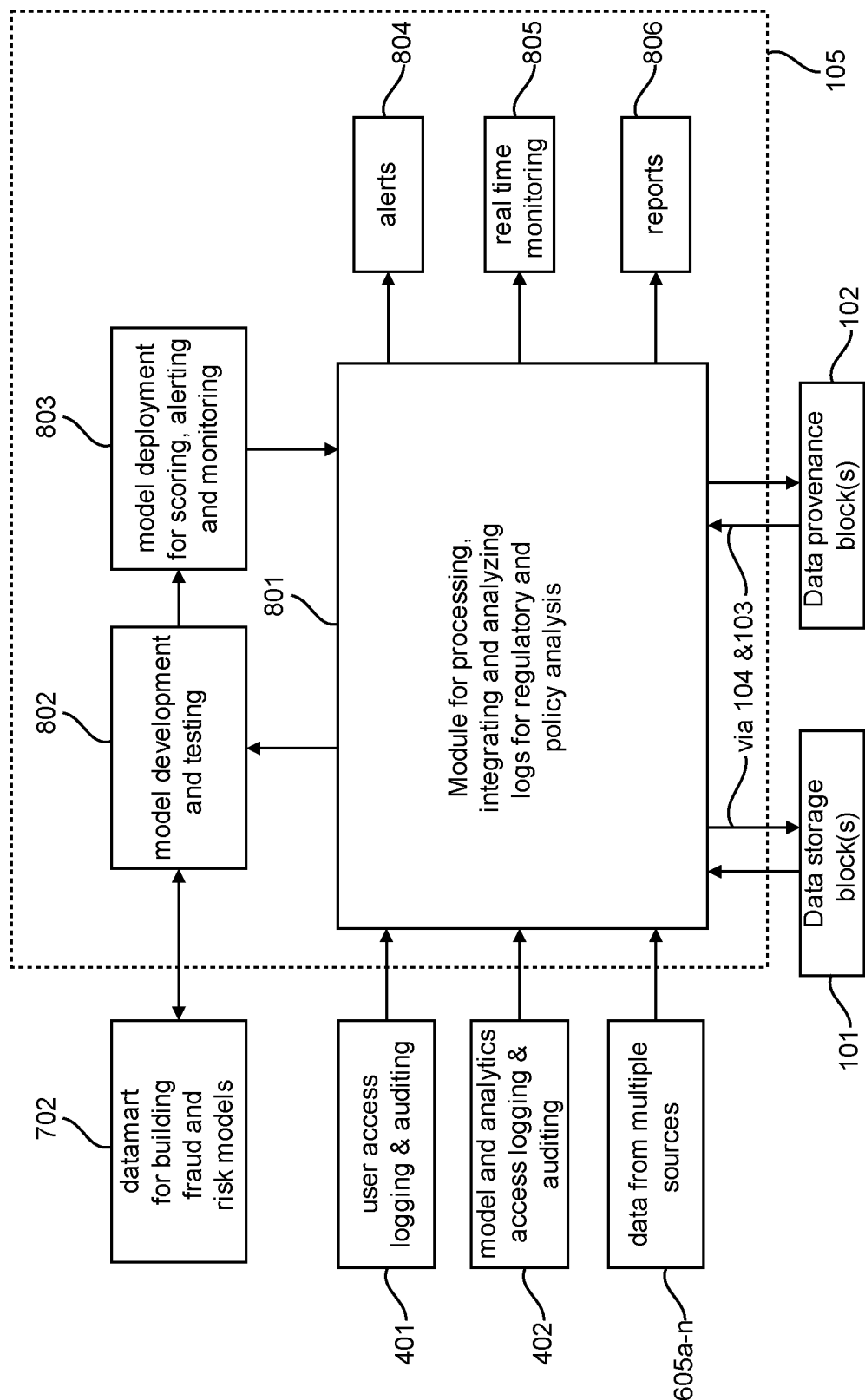
FIG. 8 illustrates software modules for checking that an entity's (e.g., a company, organization, or group) internal policies and external policies are being supported according to embodiments of the present invention.

FIG. 8 illustrates software modules for checking that an entity's internal policies and external policies required by users, data suppliers, and third-party regulatory agencies, industry best practices, and others are being supported. For example, a particular user may not have given permission for his or her historical purchases be used to score fraud and risk models. In this case, when the module 802 developed a fraud or risk model using data available in the datamart 702, module 801 would verify that this user's historical purchases, or data derived from this user's historical purchases, would not be used as part of the training data from datamart 702 by module 802 to build any models. In addition, as part of an audit analysis of historical scores, provenance blocks 102 could be analyzed to be sure that the user's historical purchases were not used to build any models. Similarly, provenance records 102 could be analyzed for any user of interest to check whether any model deployed by module 803 used data from the user being audited to ensure this data was consistent with the user's preferences at that time as provided by the user data 401, and as recorded in the relevant immutable data provenance block 101. In this way, audit reports 806 can be produced over batches of data, as well as alerts 804 and real-time monitoring records 805 for individual records being scored, as provided by the model and analytics logging data 402.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

The subject matter described herein can be implemented in a computing system that includes a back end component (e.g., a data server), a middleware component (e.g., an application server), or a front end component (e.g., a client computer mobile device, wearable device, having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method for securely storing auditable data comprising:
   generating a blockchain ledger comprising a plurality of data blocks comprising a data block encryption header and a data block encrypted payload, wherein the data block encrypted payload comprises a data block header and a data block payload;
   generating a plurality of data storage blocks stored in the data block payload of the blockchain ledger, wherein the data storage blocks are used in at least one of building an analytic model and an analytic workflow; and
   generating a plurality of data provenance blocks stored in the blockchain ledger, wherein at least one of the plurality of data provenance blocks stores provenance data related to building one of an analytic model and an analytic workflow or related to using one of an analytic model and an analytic workflow to score data and produce outputs;
   wherein at least a portion of the data stored in the data storage blocks build an analytic model or an analytic workflow, and at least a portion of the data stored in the data storage blocks score that data, and
   wherein at least a portion of the data stored in the data provenance blocks comprises logging data generated as a function of some of the data in the data storage blocks to store an analytic model or workflow and as a function of some of the data in the data storage blocks to score that data using an analytic model or analytic model.

2. The method for securely storing auditable data of claim 1 further comprising:
   providing said plurality of data provenance blocks stored in the blockchain ledger comprising said plurality of data provenance blocks stored in a data crypto header of said blockchain ledger.

3. The method for securely storing auditable data of claim 1 further comprising:
   providing a management module coupled to the blockchain ledger configured to run on one of at least one processor to create and read the data storage blocks and the data provenance blocks of the blockchain ledger.

4. The method for securely storing auditable data of claim 3 further comprising:
   providing a logging module coupled to the management module, and configured to run on one of the at least one processor to manage at least one of logging of using at least a portion of the data stored in the data storage blocks to build an analytic model or an analytic workflow, and logging of the using of at least a portion of the data stored in the data storage blocks to score that data using one of an analytic model and an analytic workflow to produce outputs, wherein the logging module is further configured to store the logging data in the data provenance blocks of the blockchain ledger.

5. The method for securely storing auditable data of claim 4 further comprising:
   providing a rules analytic module coupled to the logging module and configured to run on one of the at least one processor to read the created data provenance blocks, and check each data provenance block for compliance with each of a plurality of rules.

6. The method for securely storing auditable data of claim 5 wherein the plurality of rules are at least one of data collection rules, data sharing rules, privacy rules and regulatory requirements.

7. The method for securely storing auditable data of claim 5 wherein said rules analytic module is configured to enable at least one of a plurality of users from within an organization or a consortium of organizations to check whether data collection is compliant with at least one of the plurality of rules.

8. The method for securely storing auditable data of claim 5, wherein the rules analytic module is configured to enable at least one of a plurality of users, outside of an organization or a consortium of organizations, with confirmation of whether at least of one of access to and processing of the data by the method for securely storing auditable data, data sharing, building of models, use of scores and other outputs from models and workflows is compliant with at least one of the plurality of rules.

9. The method for securely storing auditable data of claim 5, wherein the rules analytic module is configured to enable at least one of a plurality of users within an organization or a consortium of organizations to check whether data collection is compliant with at least one of the plurality of rules.

10. The method for securely storing auditable data of claim 5, wherein the rules analytic module is configured to enable at least one of a plurality of users, outside an organization or a consortium of organizations, to check whether data collection is compliant with at least one of the plurality of rules.

11. The method for securely storing auditable data of claim 5, wherein the rules analytic module is configured so that at least one of a plurality of users, from within an organization or a consortium of organizations, with confirmation of whether at least one of access to and processing of the data blocks by the method for securely storing auditable data, data sharing, building of models, use of scores and other outputs from models and workflows is compliant with at least one of the plurality of rules.

12. The method for securely storing auditable data of claim 5, wherein the rules analytics module is configured to provide at least one of a plurality of users outside of an organization or a consortium of organizations with confirmation of whether at least one of access to and processing of the data blocks by the method for securely storing auditable data, data sharing, building of models, use of scores and other outputs from models and workflows is compliant with at least one of the plurality of rules.

13. The method for securely storing auditable data of claim 5, wherein the rules analytic module is configured to check that data collection is consistent with at least one of the plurality of rules.

14. The method for securely storing auditable data of claim 5, wherein the rules analytic module is configured to check that the use of scores and other outputs from models and workflows is compliant with at least one of the plurality of rules.

15. The method for securely storing auditable data of claim 5, wherein the rules analytic module is configured to check that access to and processing of the data storage blocks is compliant with at least one of the plurality of rules.

16. The method for securely storing auditable data of claim 5, wherein the rules analytic module is configured to check whether at least one of data sharing and building of an analytic model is consistent with at least one of the plurality of rules.

17. The method for securely storing auditable data of claim 5, wherein a log of access to the data blocks is saved to the management module.

18. The method for securely storing auditable data of claim 5, wherein the rules analytic module is configured to enable at least one of a plurality of users outside an organization or a consortium of organizations with confirmation of whether data collection is compliant with at least one of the plurality of rules.

19. The method for securely storing auditable data of claim 5, wherein the rules analytic module is configured to enable at least one of a plurality of users from within an organization or a consortium of organizations to check whether at least of one of access to and processing of the data blocks by the method for securely storing auditable data, data sharing, building of an analytic model, and use of scores and other outputs from an analytic model or an analytic workflow is compliant with at least one of the plurality of rules.

20. The method for securely storing auditable data of claim 5, wherein said data provenance blocks comprise immutable records of interactions with said data storage blocks.

* * * * *